(12) United States Patent
Su

(10) Patent No.: US 9,312,690 B2
(45) Date of Patent: Apr. 12, 2016

(54) PROTECTIVE CIRCUIT

(71) Applicant: ASMedia Technology Inc., New Taipei (TW)

(72) Inventor: Ting-Wen Su, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 227 days.

(21) Appl. No.: 14/156,452

(22) Filed: Jan. 16, 2014

(65) Prior Publication Data

US 2014/0217963 A1    Aug. 7, 2014

(30) Foreign Application Priority Data

Feb. 5, 2013    (TW) .............................. 102104424 A

(51) Int. Cl.
*H02H 9/02*    (2006.01)
(52) U.S. Cl.
CPC .................................... *H02H 9/025* (2013.01)
(58) Field of Classification Search
CPC ...................................................... H02H 9/025
USPC .......................................................... 320/107
See application file for complete search history.

(56) References Cited

U.S. PATENT DOCUMENTS 7,088,078 B2    8/2006 Liu
2007/0188134 A1*    8/2007 Hussain ................ H01M 10/44
320/114

FOREIGN PATENT DOCUMENTS

CN    101902028 A    12/2010
CN    202309053 U    7/2012

* cited by examiner

*Primary Examiner* — Thuan Do
(74) *Attorney, Agent, or Firm* — CKC & Partners Co., Ltd.

(57) ABSTRACT

A protective circuit is provided. The protective circuit includes a charging unit, a voltage regulating unit, and a comparing unit. The charging unit receives a rise signal and an over-current signal, and outputs a first reference voltage. The voltage regulating unit receives the first reference voltage and adjusts an output voltage according to the first reference voltage and a feedback voltage. The comparing unit receives the feedback voltage and compares the feedback voltage with a first threshold voltage to determine whether to output the rise signal to the charging unit.

12 Claims, 2 Drawing Sheets

PROTECTIVE CIRCUIT

CROSS-REFERENCE TO RELATED APPLICATION

This application claims the priority benefit of Taiwan application serial No. 102104424 filed on Feb. 5, 2013. The entirety of the above-mentioned patent application is hereby incorporated by reference herein and made a part of specification.

BACKGROUND OF THE INVENTION

1. Field of the Invention

The disclosure relates to a protective circuit.

2. Description of the Related Art

As electronic technology develops, various protective circuits, such as a slow start circuit or an over-current protective circuit, are commonly used in electronic devices.

A low drop-out (LDO) regulator is a conventional voltage regulator, which has a small size and low noise. When the LEO regulator starts and the output voltage rapidly changes, a high inrush current is generated. The inrush current may damage components in the circuit or form a voltage drop in the power supplied to the LDO regulator, which affects other circuits connected to the power.

BRIEF SUMMARY OF THE INVENTION

A protective circuit is provided. In an embodiment, the protective circuit is connected to an input source, provides an input current, and outputs an output voltage. The protective circuit includes a charging unit, a voltage regulating unit and a comparing unit.

The charging unit receives a rise-voltage signal and an over-current signal, and outputs a first reference voltage. The voltage regulating unit is electrically connected to the charging unit. The voltage regulating unit receives the first reference voltage, and adjusts the output voltage according to the first reference voltage and a feedback voltage.

The comparing unit is electrically connected to the voltage regulating unit and the charging unit to receive the feedback voltage and compares the feedback voltage with a first threshold voltage to determine whether to output the rise signal to the charging unit.

Consequently, a protective circuit including a slow start function and an over-current protection function is provided.

These and other features, aspects and advantages of the present disclosure will become better understood with regard to the following description, appended claims, and accompanying drawings.

DETAILED DESCRIPTION OF THE EMBODIMENTS

Figure 1:
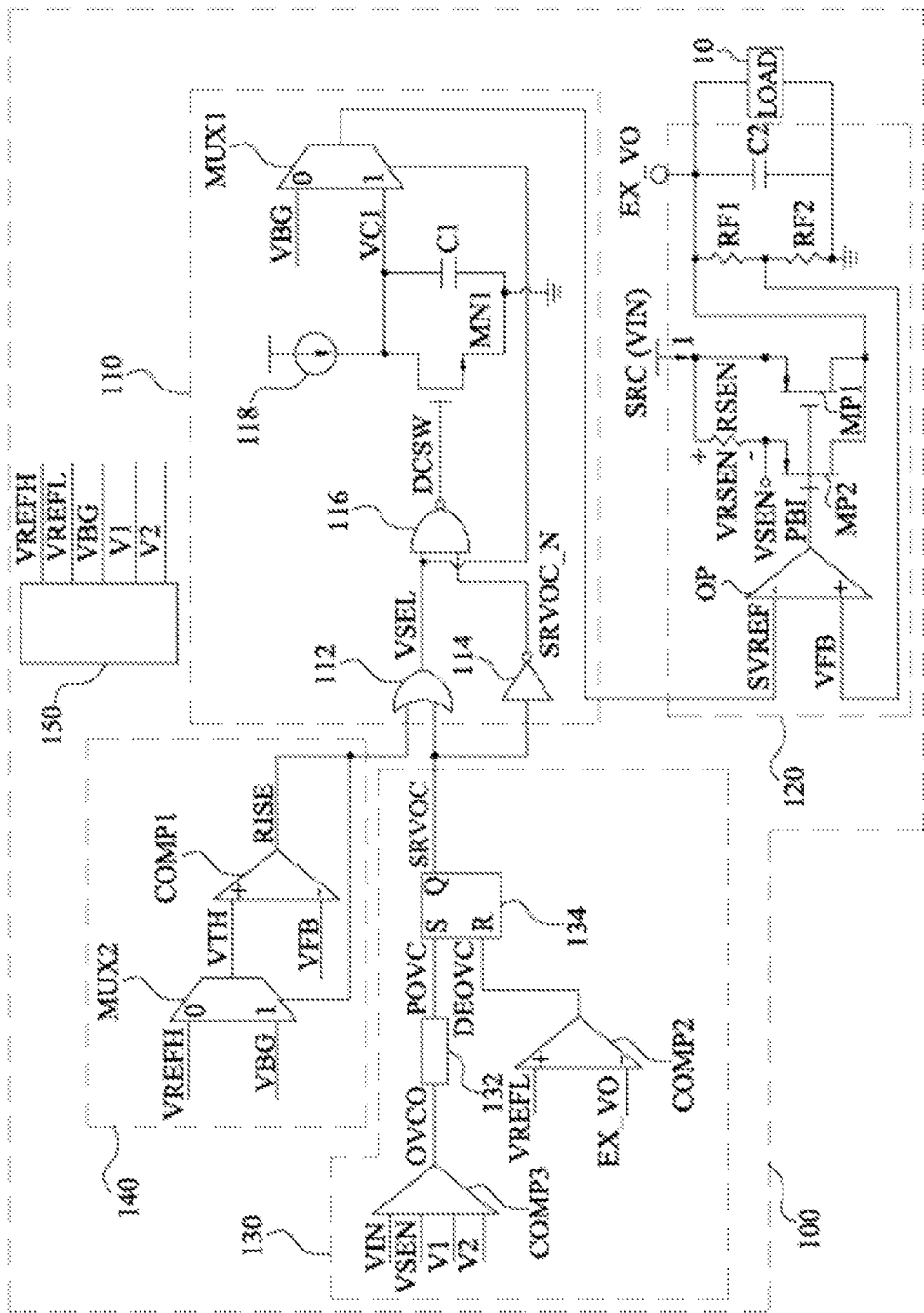
FIG. 1 is a schematic diagram showing a protective circuit in an embodiment.

FIG. 1 is a schematic diagram showing a protective circuit 100 in an embodiment. The protective circuit 100 includes a charging unit 110, a voltage regulating unit 120, an over-current detecting unit 130, a comparing unit 140 and a reference voltage generator 150. The charging unit 110 is connected to the voltage regulating unit 120, the over-current detecting unit 130, the comparing unit 140 and the reference voltage generator 150. The reference voltage generator 150 is connected to the over-current detecting unit 130 and the comparing unit 140.

In the embodiment, the voltage regulating unit 120 receives an input voltage VIN of an input source SRC, and provides an output voltage EX_VO to a load 10. The voltage regulating unit 120 includes a capacitor C2, and receives a first reference voltage SVREF. The voltage regulating unit 120 compares the first reference voltage SVREF with a feedback voltage VFB to make the input source SRC provide an input current I to charge the second capacitor C2 according to the first reference voltage SVREF and the feedback voltage VFB.

The charging unit 110 includes a capacitor C1. The charging unit 110 receives the rise-voltage signal RISE and the over-current signal SRVOC and charges or discharges the capacitor C1 accordingly. The charging unit 110 determines whether to output the capacitor voltage VC1 or the second reference voltage VBG to the voltage regulating unit 120 according to the rise-voltage signal RISE and the over-current signal SRVOC, so as to make the output voltage EX_VO of the voltage regulating unit 120 increase slowly at a slow start state or at a slow restart state. At an over-current state, the input source SRC is not connected to the load 10, and the output voltage EX_VO of the voltage regulating unit 120 decreases rapidly.

The comparing unit 140 receives the feedback voltage VFB and compares the feedback voltage VFB with a first threshold voltage VTH. The comparing unit 140 determines whether to output the rise signal RISE to the charging unit 110 according to the feedback voltage VFB and the first threshold voltage VTH, so as to stop the increasing of the output voltage EX_VO when the feedback voltage VFB exceeds the first threshold voltage VTH and the output voltage EX_VO achieves an expected value.

The over-current detecting unit 130 receives a detecting voltage VRSEN (which is the input voltage VIN minus a voltage VSEN) relating to the input current I, and compares the detecting voltage VRSEN with a second threshold voltage (V1 minus V2). The over-current detecting unit 130 determines whether to output an over-current signal SROVC to the charging unit 110 according to the detecting voltage VRSEN and the second threshold voltage (V1 minus V2), so as to inform the charging unit 110 to operate an over-current protective when the input current I is over a predetermined value.

As stated above, the protective circuit 100 with a slow start function is achieved via the voltage regulating unit 120, the charging unit 110 and the comparing unit 140. The protective circuit 100 further includes an over-current protective function via the over-current detecting unit 130.

The voltage regulating unit 120 is connected to the input source SRC and the load 10. The voltage regulating unit 120 includes an amplifier OP, an analog switch MP1, an analog switch MP2, a detecting resistor RSEN, a resistor RF1, a resistor RF2 and a capacitor C2. The analog switch MP1 and the analog, switch MP2 may be P-type transistors. An inverting input terminal of the amplifier OP is connected to the charging unit 110, a non-inverting input terminal of the amplifier OP is connected to the resistors RF1 and RF2 to receive the feedback voltage VFB, and an output terminal of the amplifier OP is connected to control terminals of the analog switches MP1 and MP2.

A first terminal of the analog switch MP1 is connected to the input source SRC, and a second terminal of the analog switch MP1 is connected to a first terminal of the capacitor C2. A first terminal of the analog switch MP2 is connected to a first terminal of the detecting resistor RSEN, and a second terminal of the analog switch MP2 is connected to the first terminal of the capacitor C2.

A second terminal of the detecting resistor RSEN is connected to the input source SRC. A first terminal of the resistor RF1 is connected to the first terminal of the capacitor C2, a second terminal of the resistor RF1 is connected to the resistor RF2 and the non-inverting input terminal of the amplifier OP, and to second terminal of the resistor RF2 is connected to a second terminal of the capacitor C2 and a ground end. The load 10 is connected to the capacitor C2 in parallel.

The output voltage EX_VO generates the feedback voltage VFB via the resistor RF1 and the resistor RF2 and provides it to the amplifier OP. The amplifier OP receives and compares the first reference voltage SVREF and the feedback voltage VFB, and adjusts the control signal PBI provided to the analog switches MP1 and MP2 according to a difference between the first reference voltage SVREF and the feedback voltage VFB. The analog switches MP1 and MP2 receive the control signal PBI and adjust the input current I flowing through the analog switches MP1 and MP2 accordingly. That is, the input source SRC can turn on the analog switches MP1 and MP2 and adjust the input current I provided to the voltage regulating unit 120 according to a voltage difference between the input voltage VIN and the control signal RBI, so as to charge the capacitor C2 and increase the output voltage EX_VO and the feedback voltage VFB as the voltage across the capacitor C2 increases. In other words, the voltage regulating unit 120 forms a close loop, and the feedback voltage VFB increases with the increasing of the first reference voltage SVREF, so as to make the output voltage EX_VO increased.

The analog switch MP2 and the detecting resistor RSEN can detect the input current I. For example, the channel width of the analog switch MP1 and that of the analog switch MP2 are in a predetermined ratio 1:K, and K is much larger than 1. Thus, the ratio of the current flowing through the analog switch MP1 and the analog switch MP2 approximately equals to the ratio of the channel width. When the input current I increases, the current flowing through the detecting resistor RSEN increases, and the voltage across the detecting resistor RSEN (which is the detecting voltage VRSEN equaling to VIN minus VSEN) also increases. Consequently, the value of the input current I can be obtained by measuring the detecting voltage VRSEN. If the protective circuit 100 does not have an over-current protective function in an embodiment, the analog switch MP2 and the detecting resistor RSEN can be omitted.

The charging unit 110 includes an OR gate 112, a NOT gate 114, a NAND gate 116, a current source 118, a control switch MN1 (such as an N-type transistor), a capacitor C1 and a multiplexer MUX1. A first input terminal of the OR gate 112 is connected to the comparing unit 140, a second input terminal of the OR gate 112 is connected to the over-current detecting unit 130, and an output terminal of the OR gate 112 is connected to a first input terminal of the NAND gate 116 and a control terminal of the multiplexer MUX1. An input terminal of the NOT gate 114 is connected to the over-current detecting unit 130, and an output terminal of the NOT gate 114 is connected to a second input terminal of the NAND gate 116.

A first terminal of the control switch MN1 is connected to the current source 118 and a first terminal of the capacitor C1, a second terminal of the control switch MN1 is connected to a second terminal of the capacitor C1 and a ground end, and a control terminal of the control switch MN1 is connected to an output terminal of the NAND gate 116. A first input terminal of the multiplexer MUN1 is connected to the reference voltage generator 150 to receive the second reference voltage VBG, a second input terminal of the multiplexer MUX1 is connected to the first terminal of the capacitor C1, and an output terminal of the multiplexer MUX1 is connected to an inverting input terminal of the amplifier OP.

The OR gate 112 receives the rise-voltage signal RISE provided by the comparing unit 140 and the over-current signal SRVOC provided by the over-current detecting unit 130. The OR gate 112 determines whether to output a select signal VSEL to the NAND gate 116 and the multiplexer MUX1 according to the rise-voltage signal RISE and the over-current signal SRVOC. The NOT gate 114 receives the over-current signal SRVOC and determines whether to output an invert over-current signal SRVOC_N to the NAND gate 116 accordingly.

The NAND gate 116 receives the select signal VSEL and the invert over-current signal SRVOC_N, and determines whether to output a switch signal DCSW to the control switch MN1 according to the select signal VSEL and the invert over-current signal SRVOC_N. The control switch MN1 receives the switch signal DCSW and it is turned on or off accordingly. When the control switch MN1 is turned off, the current source 118 charges the capacitor C1, and when the control switch MN1 is turned on the capacitor C1 is discharged via the control switch MN1. In other words, the control switch MN1 is turned on or of according to the rise-voltage signal RISE and the over-current signal SRVOC, so as to make the capacitor C1 charged or discharged.

The multiplexer MUX1 receives the second reference voltage VBG, the capacitor voltage VC1 and the select signal VSEL, and outputs the constant second reference voltage VBG or the capacitor voltage VC1 to the voltage regulating unit 120 as the first reference voltage SVREF according to the select signal VSEL. The capacitor voltage VC1 is the voltage across the capacitor C1.

The comparing unit 140 includes a multiplexer MUX2 and a comparator COMP1. Two input terminals of the multiplexer MUX2 are connected to the reference voltage generator 150 to receive a third reference voltage VREFH and the second reference voltage VBG, respectively. An output terminal of the multiplexer MUX2 is connected to a first input terminal of the comparator COMP1. A second input terminal of the comparator COMP1 receives the feedback voltage VFB, and an output terminal of the comparator COMP1 is connected to a control terminal of the multiplexer MUX2 and a first input terminal of the OR gate 112.

The multiplexer MUX2 receives the third reference voltage VREFH, the second reference voltage VBG and the rise-voltage signal RISE, and it outputs the third reference voltage VREFH or the second reference voltage VBG to the comparator COMP1 as the first threshold voltage VTH according to the rise-voltage signal RISE. The comparator COMP1 receives and compares the first threshold voltage VTH and the feedback voltage VFB, and it determines whether to output the rise-voltage signal RISE to the multiplexer MUX2 and the charging unit 110 accordingly.

The over-current detecting unit 130 includes a comparator COMP2, a comparator COMP3, an edge detection circuit 132 and an S-R latch 134. A first input terminal and a second input terminal of the comparator COMP3 are connected to two ends of the detecting resistor RSEN, respectively. A third input terminal and a fourth input terminal of the comparator COMP3 are connected to the reference voltage generator 150 to receive a fourth reference voltage V1 and a fifth reference voltage V2, and an output terminal of the comparator COMP3 is connected to an input terminal of the edge detection circuit 132. An output terminal of the edge detection circuit 132 is connected to an S terminal of the SR latch 134. A non-inverting input terminal of the comparator COMP2 is connected to the reference voltage generator 150, an inverting input terminal of the comparator COMP2 is connected to the first terminal of the capacitor C2, and an output terminal of the comparator COMP2 is connected to an R terminal of the S-R latch 134. An output terminal of the S-R latch 134 is connected to a second input terminal of the OR gate 112.

The comparator COMP3 receives and compares the fourth reference voltage V1, the fifth reference voltage V2, the voltage VIN and the voltage VSEN, and it determines whether to output a compare signal OVCO to the edge detection circuit 132 accordingly. The edge detection circuit 132 receives the compare signal OVCO and determines whether to output a pulse signal POVC to the S-R latch 134 accordingly.

The comparator COMP2 receives and compares the sixth reference voltage VREFL (which is the third threshold voltage) and the output voltage EX_VO, and it determines whether to output a compare signal DEOVC to the S-R latch 134 accordingly. The S-R latch 134 receives the pulse signal POVC and the compare signal DEOVC and determines whether to output the over-current signal SRVOC to the charging unit 110 accordingly. In other words, when the input current I exceeds a predetermined threshold, the SR latch 134 outputs the over-current signal SRVOC (for example, it outputs a high voltage level) and stops outputting the over-current signal SRVOC when the output voltage EX_VO is smaller than the third threshold voltage.

The reference voltage generator 150 outputs the third reference voltage VREFH, the sixth reference voltage VREFL, the second reference voltage VBG, the fourth reference voltage V1 and the fifth reference voltage V2. The values of the reference voltages can be adjusted according to requirements. In the embodiment, V1>V2 and VBG>VREFH>VREFL.

Figure 2:
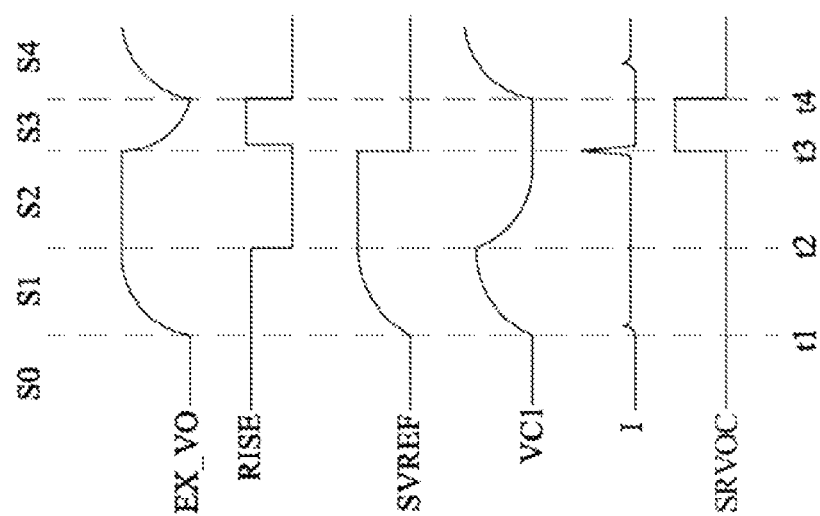
FIG. 2 is a sequence diagram showing different states of the protective circuit in FIG. 1.

FIG. 2 is a sequence diagram showing different states of the protective circuit 100 in FIG. 1. The operation of the protective circuit 100 is further illustrated with FIG. 1 and FIG. 2 hereinafter.

Before time point t1, the protective circuit 100 has not been started (state S0). The output voltage EX_VO is 0, and thus the feedback voltage VFB is also 0. In the embodiment, the third reference voltage VREFH and the second reference voltage VBG may be set larger than 0, so as to make the voltage outputted by the multiplexer MUX2 larger than the feedback voltage VFB.

The comparator COMP1 compares the output voltage of the multiplexer MUX2 with the feedback voltage VFB, and outputs the rise-voltage signal RISE (for example, it outputs a high voltage level) accordingly. The multiplexer MUX2 outputs the second reference voltage VBG as the first threshold voltage VTH according to the rise-voltage signal RISE. Since an over-current is not generated, the S-R latch 134 does not output the over-current signal SRVOC (for example, it may output a low voltage level).

At the time point t1, the protective circuit 100 switches to the slow start state (state S1). The OR gate 112 receives the rise-voltage signal RISE and outputs the select signal VSEL (for example, it outputs a high voltage level) accordingly. Since the NOT gate 114 does not receive the over-current signal SRVOC (for example, it receives a low voltage level), it outputs the invert over-current signal SRVOC_N (for example, it outputs a high voltage level). Then, the NAND gate 116 receives the select signal VSEL and the invert over-current signal SRVOC_N and does not output the switch signal DCSW (for example, it outputs a low voltage level) accordingly, so as to turn off the control switch MN1 and make the current source 118 charge the capacitor C1 to increase the voltage across the capacitor C1. The multiplexer MUX1 receives the select signal VSEL and outputs the capacitor voltage VC1 accordingly.

When the voltage across the capacitor C1 increases and the capacitor voltage VC1 is larger than 0, the amplifier OP receives and compares the capacitor voltage VC1 and the feedback voltage VFB, so as to output the control signal PBI at a first level (for example, it outputs a low voltage level) accordingly. The input source SRC selectively turns on the analog switch MP1 and MP2 to adjust the input current I provided to the voltage regulating unit 120 according to a voltage difference between the input voltage VIN and the control signal PBI, so as to charge the capacitor C2 and increase the output voltage EX_VO slowly with the increasing of the voltage across the capacitor C2.

At time point t2, the protective circuit 100 switches to the start completion state (state S2). The feedback voltage VFB is larger than the first threshold voltage VTH which equals to the second reference voltage VBG, so as to make the comparator COMP1 stop outputting the rise-voltage signal RISE (for example, it may output a low voltage level). Correspondingly, the multiplexer MUX2 outputs the third reference voltage VREFH as the first threshold voltage VTH.

Since the OR gate 112 does not receive the rise-voltage signal RISE and the over-current signal SRVOC, it does not output the select signal VSEL (for example, it outputs a low voltage level). The NAND gate 116 does not receive the select signal VSEL, and thus it outputs the switch signal DCSW (for example, it outputs a high voltage level) to turn on the control switch MN1. Thus, the capacitor C1 is discharged via the control switch MN1, and the voltage across the capacitor C1 decreases. The multiplexer MUX1 does not receive the select signal VSEL, and outputs the constant second reference voltage VBG to voltage regulating unit 120 to stabilize the output voltage EX_VO and the feedback voltage VFB.

At time point t3, an over-current is generated (which means the input current I exceeds the predetermined threshold), and the protective circuit 100 switches to the over-current state (state S3). The detecting voltage VRSEN is larger than the second threshold voltage, and the comparator COMP3 outputs the compare signal OVCO (for example, it outputs a high voltage level). Then, the edge detection circuit 132 receives the compare signal OVCO and outputs the pulse signal POVC accordingly. The S-R latch 134 receives the pulse signal POVC and outputs the over-current signal SRVOC (for example, it outputs a high voltage level) accordingly.

The OR gate 112 receives the over-current signal SRVOC and outputs the select signal VSEL accordingly. On the other hand, the NOT gate 114 receives the over-current signal SRVOC and does not output the invert over-current signal SRVOC_N (for example, it outputs a low voltage level) accordingly. The NAND gate 116 receives the select signal VSEL and does not receive the invert over-current signal SRVOC_N. Thus, the NAND gate 116 outputs the switch signal DCSW correspondingly to turn on the control switch MN1. The multiplexer MUX1 receives the select signal VSEL and outputs the capacitor voltage VC1 to the amplifier OP accordingly.

Moreover, since the capacitor C1 is at a discharging state and the feedback voltage VFB is stable during the time point t2 to t3, the feedback voltage VFB is larger than the capacitor voltage VC1, and the amplifier OP compares the capacitor voltage VC1 with the feedback voltage VFB and outputs the control signal PBI at a second level (for example, it outputs a high voltage level) accordingly. Since the voltage difference between the input voltage VIN and the control signal PBI cannot turn on the analog switches MP1 and MP2, the transistors MP1 and MP2 are off, the capacitor C2 is discharged, and the output voltage EX_VO and the feedback voltage VFB decreases with the voltage decreasing across the capacitor C2. Then, when the feedback voltage VFB decreases and is smaller than the first threshold voltage VTH which equals to VREFH, the comparator COMP1 outputs the rise signal RISE according to the feedback voltage VFB and the first threshold voltage VTH.

At time point t4, the protective circuit 100 switches to the slow restart state (state S4). The output voltage EX_VO is smaller than the sixth reference voltage VREFL, and the comparator COMP2 outputs the compare signal DEOVC (for example, it outputs a high voltage level). The S-R latch 134 receives the compare signal DEOVC and stops outputting the over-current signal SRVOC accordingly. The subsequent operation can be referred to the slow start state (step S1), and the output voltage EX_VO increases slowly, which is omitted herein.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A protective circuit connected to an input source, wherein the input source provides an input current, and the protective circuit outputs an output voltage, the protective circuit comprising:
   a charging unit for receiving a rise-voltage signal and an over-current signal and outputting a first reference voltage;
   a voltage regulating unit electrically connected to the charging unit, wherein the voltage regulating unit receives the first reference voltage, and adjusts the output voltage according to the first reference voltage and a feedback voltage corresponding to the input current;
   a comparing unit electrically connected to the voltage regulating unit and the charging unit for receiving the feedback voltage, and comparing the feedback voltage with a first threshold voltage to determine whether to output the rise-voltage signal to the charging unit; and
   an over-current detecting unit electrically connected to the voltage regulating unit and the charging unit for receiving a detecting voltage corresponding to the input current from the voltage regulating unit, wherein the over-current detecting unit compares the detecting voltage with a second threshold voltage to determine whether to output the over-current signal.

2. The protective circuit according to claim 1, wherein the charging unit includes a multiplexer, the multiplexer receives a second reference voltage and a capacitor voltage, and the multiplexer determines whether to output the second reference voltage or the capacitor voltage as the first reference voltage according to the rise-voltage signal and a second reference voltage.

3. The protective circuit according to claim 2, wherein the charging unit further includes:
   a control switch;
   a current source electrically connected to the control switch; and
   a capacitor electrically connected to the control switch to provide the capacitor voltage,
   wherein the control switch adjusts the capacitor voltage according to the rise-voltage signal and the over-current signal.

4. The protective circuit according to claim 3, wherein at a slow start state, the charging unit adjusts the control switch according to the rise-voltage signal to increase the capacitor voltage and outputs the capacitor voltage to the voltage regulating unit.

5. The protective circuit according to claim 3, wherein at a start completion state, when the feedback voltage is larger than the first threshold voltage, the comparing unit stops outputting the rise-voltage signal to the charging unit to make the charging unit reduce the capacitor voltage and output the second reference voltage to the voltage regulating unit.

6. The protective circuit according to claim 1, wherein the voltage regulating unit includes an amplifier and a first analog switch, and the amplifier adjusts the first analog switch according to the first reference voltage and the feedback voltage.

7. The protective circuit according to claim 1, wherein the comparing unit generates the first threshold voltage according to a third reference voltage and a second reference voltage.

8. The protective circuit according to claim 1, wherein the charging unit selectively increases or reduces the capacitor voltage and selectively outputs the capacitor voltage or a second reference voltage according to the over-current signal.

9. The protective circuit according to claim 1, wherein the voltage regulating unit includes:
   a first analog switch;
   a second analog switch; and
   a detecting resistor connected to the second analog switch in series, wherein the first analog switch is connected to the second analog switch and the detecting resistor, the input current flowing through the first analog switch and a current flowing through the second analog switch are in a predetermined ratio, and the current flowing through the second analog switch forms the detecting voltage at the detecting resistor.

10. The protective circuit according to claim 1, wherein at an over-current state, when the detecting voltage is larger or equals to the second threshold voltage, the over-current detecting unit outputs the over-current signal to the charging unit, and the charging unit reduces the capacitor voltage and outputs the capacitor voltage to the voltage regulating unit to stop providing the input current to the voltage regulating unit.

11. The protective circuit according to claim 1, wherein at the over-current state, when the feedback voltage is smaller than the first threshold voltage, the comparing unit outputs the rise-voltage signal to the charging unit.

12. The protective circuit according to claim 1, wherein the over-current detecting unit further receives the output voltage, compares the output voltage with a third threshold voltage, and determines whether to output the over-current signal to the charging unit according to the output voltage and the third threshold voltage.

* * * * *